US012175491B2

(12) United States Patent
Yumita et al.

(10) Patent No.: US 12,175,491 B2
(45) Date of Patent: Dec. 24, 2024

(54) SERVER AND POWER ADJUSTMENT SYSTEM

(71) Applicant: TOYOTA JIDOSHA KABUSHIKI KAISHA, Toyota (JP)

(72) Inventors: Osamu Yumita, Seto (JP); Yoichi Onishi, Okazaki (JP); Toru Ando, Obu (JP); Ikuma Suzuki, Okazaki (JP); Yu Nagata, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/204,491

(22) Filed: Jun. 1, 2023

(65) Prior Publication Data

US 2024/0037597 A1 Feb. 1, 2024

(30) Foreign Application Priority Data

Aug. 1, 2022 (JP) .................. 2022-122491

(51) Int. Cl.
*B60L 55/00* (2019.01)
*B60L 53/62* (2019.01)
(Continued)

(52) U.S. Cl.
CPC .......... *G06Q 30/0236* (2013.01); *B60L 53/62* (2019.02); *B60L 53/63* (2019.02);
(Continued)

(58) Field of Classification Search
CPC ......... G06Q 30/0236; G06Q 10/06315; G06Q 50/06; G06Q 10/02; B60L 53/68;
(Continued)

(56) References Cited

U.S. PATENT DOCUMENTS

2009/0313104 A1* 12/2009 Hafner .................. G06Q 20/10
705/14.25
2010/0256846 A1* 10/2010 Shaffer ................. G06Q 10/06
701/22

(Continued)

FOREIGN PATENT DOCUMENTS

JP 2021-129441 A 9/2021
WO WO-2024105192 A1 * 5/2024 ............. B60L 53/63

OTHER PUBLICATIONS

Y. He, B. Venkatesh and L. Guan, "Optimal Scheduling for Charging and Discharging of Electric Vehicles," in IEEE Transactions on Smart Grid, vol. 3, No. 3, pp. 1095-1105, Sep. 2012, doi: 10.1109/TSG.2011.2173507. https://ieeexplore.ieee.org/abstract/document/6244822 (Year: 2012).*

*Primary Examiner* — George Chen
*Assistant Examiner* — Lisa Ma
(74) *Attorney, Agent, or Firm* — Dinsmore & Shohl LLP (57) ABSTRACT

A server manages power adjustment resources electrically connected to a power network. The power adjustment resources include power equipment installed in a facility and configured to supply power from a vehicle to the power network and charge power from the power network to the vehicle. When reservation information for using the facility is received from a user, the server predicts a power supply-demand balance in the power network on a reserved date and time of use of the facility. When a DR for adjusting the power supply-demand balance is predicted to be performed on the reserved date and time of use, the server prepares a use plan for the facility so as to include the vehicle participating in the DR using the power equipment. The server gives an incentive to the user when the user accepts the use plan.

8 Claims, 6 Drawing Sheets

(51) Int. Cl.
  *B60L 53/63* (2019.01)
  *B60L 53/68* (2019.01)
  *G06Q 10/02* (2012.01)
  *G06Q 10/0631* (2023.01)
  *G06Q 30/0207* (2023.01)
  *G06Q 50/06* (2024.01)
  *H02J 3/00* (2006.01)

(52) U.S. Cl.
  CPC ............... *B60L 53/68* (2019.02); *B60L 55/00* (2019.02); *G06Q 10/06315* (2013.01); *G06Q 50/06* (2013.01); *H02J 3/003* (2020.01); *H02J 3/004* (2020.01); *G06Q 10/02* (2013.01)

(58) Field of Classification Search
  CPC .......... B60L 55/00; B60L 53/62; B60L 53/63; H02J 3/003; H02J 3/004
  USPC .......................................................... 705/5
  See application file for complete search history.

(56) References Cited

U.S. PATENT DOCUMENTS

| | | | |
|---|---|---|---|
| 2013/0179135 A1* | 7/2013 | Kang | B60L 55/00 |
| | | | 703/8 |
| 2013/0311658 A1* | 11/2013 | Solomon | G06Q 50/06 |
| | | | 709/225 |
| 2017/0372244 A1* | 12/2017 | Westergaard | H02J 3/14 |
| 2020/0006954 A1* | 1/2020 | Miyata | H02J 13/00026 |
| 2020/0403419 A1* | 12/2020 | Yokoyama | G06Q 30/0207 |
| 2021/0252993 A1 | 8/2021 | Kinomura et al. | |
| 2023/0063075 A1* | 3/2023 | Misra | G06Q 30/0206 |

* cited by examiner

<USE PLAN B>

| DATE | MEANS OF TRAVEL | EVENT | POWER SUPPLY-DEMAND INFORMATION | INCENTIVE INFORMATION |
|---|---|---|---|---|
| DAY 1 | SHINKANSEN | DEPART FROM A STATION | | ○ DISCOUNT COUPON FOR RENTAL CAR<br>○ DISCOUNT COUPON FOR ENTRANCE FEE |
| | | ARRIVE AT B STATION | | |
| | RENTAL CAR | ARRIVE AT C LAND | DR REQUEST TIME BAND / PARTICIPATION IN DR | |
| | | DEPART FROM C LAND | | |
| | RENTAL CAR | ARRIVE AT ACCOMMODATION FACILITY | | |
| DAY 2 | | DEPART FROM ACCOMMODATION FACILITY | EXTERNAL POWER CHARGE | ○ DISCOUNT COUPON FOR DINING AND SHOPPING |
| | RENTAL CAR | ARRIVE AT D MARKET | | |
| | | DEPART FROM D MARKET | PARTICIPATION IN DR / DR REQUEST TIME BAND | |
| | RENTAL CAR | ARRIVE AT B STATION | | |
| | SHINKANSEN | ARRIVE AT A STATION | | |

SERVER AND POWER ADJUSTMENT SYSTEM

CROSS-REFERENCE TO RELATED APPLICATION

This application claims priority to Japanese Patent Application No. 2022-122491 filed on Aug. 1, 2022, incorporated herein by reference in its entirety.

BACKGROUND

1. Technical Field

The present disclosure relates to a server and a power adjustment system.

2. Description of Related Art

Japanese Unexamined Patent Application Publication No. 2021-129441 (JP 2021-129441 A) discloses a power management system that manages power to be exchanged between charge/discharge stands to which a plurality of electrified vehicles is connectable and a power network. In the power management system, a server adjusts the power to be exchanged between the charge/discharge stands and the power network using electrified vehicles whose period of power supply-demand adjustment in the power network is included in a period for which the electrified vehicles are connected to the charge/discharge stands.

SUMMARY

In order to efficiently perform power adjustment in a power network, it is required to connect a large number of electrified vehicles to power charge/discharge stands in a period for which the power adjustment is performed in the power network. In order to promote electrified vehicles to participate in the power adjustment, it is necessary to increase the opportunity for the electrified vehicles to participate in the power adjustment, and to build a scheme to positively give an incentive to users for participation in the power adjustment.

The present disclosure has been made to address the foregoing issue, and an object of the present disclosure is to promote vehicles to participate in power adjustment in a power network.

(1) A first aspect of the present disclosure provides a server that manages power adjustment resources electrically connected to a power network. The power adjustment resources include power equipment. The power equipment is installed in a facility, and configured to be able to supply power from a vehicle to the power network and charge power from the power network to the vehicle. The server includes a processor and a memory that stores a program that is executable by the processor. When an input of reservation information for using the facility is received from the user, the processor executes the program to predict a power supply-demand balance in the power network on a reserved date and time of use of the facility. When it is predicted that a demand response (DR) for adjusting the power supply-demand balance is to be performed on the reserved date and time of use, the processor prepares a use plan for the facility so as to include the vehicle participating in the DR using the power equipment, and presents the use plan to the user. The processor gives an incentive to the user when the user accepts the use plan.

With the configuration according to (1), it is possible to increase the opportunity for the vehicle that is used by the user to participate in a DR, by presenting to the user a use plan that includes the vehicle participating in a DR using the power equipment installed in the facility when the user makes a reservation for use of the facility. In addition, it is possible to promote participation of the vehicle in a DR by giving an incentive to the user that has accepted the use plan. Consequently, it is possible to increase the number of vehicles that participate in a DR, and therefore to efficiently execute power adjustment in the power network. In addition, use of the facility by the user is promoted because of the incentive, and therefore it is possible to increase the number of users of the facility.

(2) In the configuration according to (1), the processor may prepare the use plan so as to include information about a time band for which the vehicle participates in the DR and information about the incentive for such participation.

With the configuration according to (2), the user can select whether to cause the vehicle to participate in a DR in consideration of the action schedule of the user himself/herself on the reserved date and time of use, the incentive, etc., by referencing the use plan presented from the server.

(3) In the configuration according to (1), the processor may increase the incentive when the vehicle is a rental car compared to when the vehicle is a vehicle owned by the user.

With the configuration according to (3), it is possible to promote use of the facility by the user because of the incentive, and to promote use of the rental car.

(4) In the configurations according to (1) to (3), the incentive may include at least one of a bonus about use of the facility, a bonus about use of other facilities around the facility, and a bonus about use of public transportation.

With the configuration according to (4), it is possible to promote use of the facility by the user because of the incentive, and to also promote use of other facilities around the facility.

(5) In the configurations according to (1) to (3), the processor may calculate an amount of power needed for travel of the vehicle from an expected travel distance of the vehicle acquired from the use plan. The processor may set an amount of power to be supplied from the power network to the vehicle so as to be equal to or more than the calculated amount of power.

With the configuration according to (5), it is possible to at least secure travel of the vehicle during use of the facility.

(6) In the configuration according to (5), when the vehicle participates in the DR on the reserved date and time of use and the DR involves power supply from the vehicle to the power network, the processor may set the amount of power to be supplied from the power network to the vehicle so as to be more than the amount of power needed for travel of the vehicle.

With the configuration according to (6), the vehicle can accede to a request for a DR, while securing travel during use of the facility, by being configured to store an amount of power that is more than the amount of power needed for the next travel during charge from the power network to the vehicle. Consequently, the user can acquire the incentive.

(7) In the configuration according to (6), when the DR involves power supply from the vehicle to the power network, the processor may control the amount of power to be supplied from the vehicle to the power network in such a range that an amount of charge in the vehicle does not fall below the calculated amount of power.

With the configuration according to (7), it is possible to secure an amount of power needed for travel of the vehicle, and to supply the remaining amount of power to the power network. When the incentive is set in accordance with the amount of power to be supplied to the power network, there is a possibility that the user can acquire a high incentive.

(8) A second aspect of the present disclosure provides a power adjustment system including: power adjustment resources electrically connected to a power network; and a server that manages the power adjustment resources. The power adjustment resources include power equipment. The power equipment is installed in a facility, and configured to be able to supply power from a vehicle to the power network and charge power from the power network to the vehicle. When an input of reservation information for using the facility is received from the user, the server predicts a power supply-demand balance in the power network on a reserved date and time of use of the facility. When it is predicted that a DR for adjusting the power supply-demand balance is to be performed on the reserved date and time of use, the server prepares a use plan for the facility so as to include the vehicle participating in the DR using the power equipment, and presents the use plan to the user. The server gives an incentive to the user when the user accepts the use plan.

With the configuration according to (8), it is possible to increase the opportunity for the vehicle that is used by the user to participate in a DR, by presenting to the user a use plan that includes the vehicle participating in a DR using the power equipment installed in the facility when the user makes a reservation for use of the facility. In addition, it is possible to promote participation of the vehicle in a DR by giving an incentive to the user that has accepted the use plan. Consequently, it is possible to increase the number of vehicles that participate in a DR, and therefore to efficiently execute power adjustment in the power network. In addition, use of the facility by the user is promoted because of the incentive, and therefore it is possible to increase the number of users of the facility.

With the present disclosure, it is possible to promote participation of a vehicle in power adjustment in a power network.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding portions are denoted by the same signs throughout the drawings, and description thereof will not be repeated.

Overall Configuration of Power Adjustment System

Figure 1:
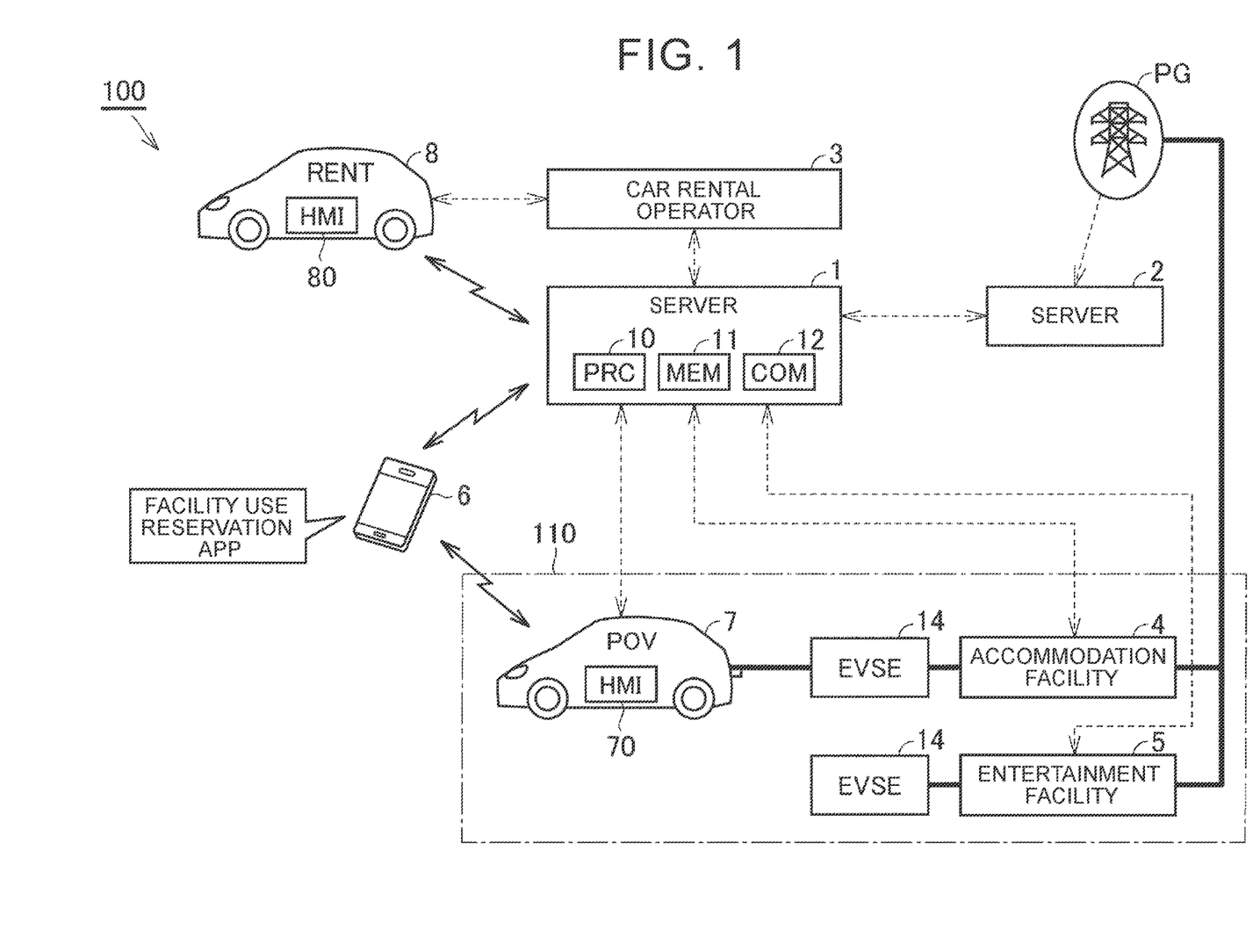
FIG. 1 illustrates a schematic configuration of a power adjustment system according to an embodiment.

FIG. 1 illustrates a schematic configuration of a power adjustment system according to an embodiment of the present disclosure.

As illustrated in FIG. 1, a power adjustment system 100 according to the embodiment includes a server 1, a server 2, a plurality of vehicles 7, 8, and a plurality of EVSEs (electric vehicle supply equipment) 14.

A power system PG is a power network constructed by a power plant and power transmission and distribution facilities (not illustrated). In the present embodiment, a power company serves as both a power generation operator and a power transmission and distribution operator. The power company corresponds to a general power transmission and distribution operator, and maintains and manages the power system PG.

The server 2 is a computer that belongs to the power company and that manages the power supply-demand balance in the power system PG. The server 2 is configured to be able to communicate with the server 1. The server 2 requests the server 1 for power adjustment in the power system PG as necessary. For example, the server 2 occasionally requests the server 1 for power supply when there is a high power demand in the power system PG.

The server 1 is configured to accede to the request for power adjustment from the server 2 using a plurality of power adjustment resources. The server 1 is a server managed by an aggregator. The aggregator is a power business operator that provides an energy management service by bundling the power adjustment resources such as areas and predetermined facilities. The server 1 corresponds to an embodiment of the "server".

The server 1 can perform remote integral control of the power adjustment resources to cause the power adjustment resources to function as a virtual power plant (VPP). In order to perform integral control of the power adjustment resources, the server 1 can perform a demand response (DR) for the power adjustment resources. The DR requests the power adjustment resources for power adjustment (e.g. promotion of power consumption, suppression of power consumption, or a reverse power flow) in the power system PG.

The server 1 includes a control device 10, a storage device 11, and a communication device 12. The control device 10 includes a processor, and is configured to execute predetermined computation processing. The storage device 11 includes a memory that stores a program to be executed by the control device 10, and stores various kinds of information (such as maps, relational expressions, and parameters) to be used for the program. The communication device 12 includes a communication interface, and is configured to communicate with the outside (such as other servers and vehicles).

A plurality of EVSEs 14 is installed in a region 110 managed by the power adjustment system 100. The term "EVSE" means equipment for supplying power to vehicles. Each of the EVSEs 14 is electrically connected to the power system PG. The EVSEs 14 are configured to supply power to a vehicle when electrically connected to the vehicle. The EVSEs 14 are also configured to receive power from the vehicle. The EVSEs 14 are a type of the power adjustment resources managed by the server 1, and correspond to an embodiment of the "power equipment".

There are accommodation facilities 4 and entertainment facilities 5 in the region 110. The accommodation facilities 4 include hotels, inns, pensions, guesthouses, etc. The entertainment facilities 5 include amusement parks, theme parks, museums, zoos, aquariums, nature parks, etc. There may be one or more accommodation facilities 4 and entertainment facilities 5 in the region 110.

The EVSEs 14 include an EVSE 14 installed in the accommodation facility 4 and an EVSE 14 installed in the entertainment facility 5. These EVSEs 14 are installed in a parking lot of the accommodation facility 4 or the entertainment facility 5, for example. There may be one or more EVSEs 14 installed in each facility.

The vehicles 7, 8 may specifically include a plug-in hybrid electric vehicle (PHEV), a battery electric vehicle (BEV), a plug-in fuel cell vehicle, etc. The vehicles 7, 8 include human machine interfaces (HMIs) 70, 80, respectively, for exchanging various kinds of information with users. The HMIs 70, 80 may be a touch panel display (not illustrated) of a navigation system, for example.

Each of the vehicles 7, 8 is configured to be able to supply power from the power system PG to the vehicle by connecting a charge cable connected to the EVSE 14 to an inlet (not illustrated) of the vehicle. This mode of power supply is referred to as "external power charge". Each of the vehicles 7, 8 is also configured to be able to supply power from the vehicle to the power system PG by connecting the charge cable to an outlet (not illustrated) of the vehicle. This mode of power supply is referred to as "external power supply".

The vehicle 7 is a vehicle (personally owned vehicle: POV) owned by a user that uses the accommodation facility 4 or the entertainment facility 5. In the following, the vehicle 7 is also referred to as a "POV 7". The vehicle 8 is a business vehicle managed by a vehicle service provider such as a car rental operator 3 or a car sharing operator. In the following, the vehicle 8 is also referred to as a "rental car 8". A server that belongs to the car rental operator 3 is configured to be able to bidirectionally communicate with the server 1.

Power Adjustment in Power System

As discussed above, the server 2 requests the server 1 for power adjustment in the power system PG, as necessary, in order to keep the power supply-demand balance in the power system PG. In response to the request for power adjustment, the server 1 performs a DR for the power adjustment resources including the EVSEs 14.

The EVSEs 14 can cause the vehicles connected to the EVSEs 14 to perform the power adjustment requested by the server 1. In the example in FIG. 1, each of the POV 7 and the rental car 8 can participate in a DR through external power charge or external power supply. Vehicles that participate in a DR permit the server 1 to remotely control the vehicles. In a situation in which the server 1 is permitted to remotely control the vehicles, the server 1 controls the EVSEs 14 such that power adjustment (promotion of charge, suppression of charge, or discharge) in the power system PG is performed by the vehicles. Consequently, the vehicles can execute external power charge or external power supply by acceding to a request for participation in a DR from the server 1.

In the power adjustment system 100 discussed above, it is necessary that a large number of vehicles should participate in a DR, in order to efficiently perform power adjustment when a request for power adjustment in the power system PG is received from the server 2. In the present embodiment, vehicles can participate in a DR when users that use the accommodation facility 4 and the entertainment facility 5 connect the vehicles to the EVSEs 14.

Thus, the server 1 is configured to present, to a user, a facility use plan prepared so as to include the vehicle (POV 7 or rental car 8) that is used by the user participating in a DR using the EVSE 14 when a reservation for use of the accommodation facility 4 or the entertainment facility 5 is received from the user and it is predicted that a DR is to be performed on the day of use as described below. Further, the server 1 is configured to give an incentive, as a compensation for participation in a DR, to a user that has accepted the presented use plan.

Reservation for Use of Facility

As illustrated in FIG. 1, a user that desires to use the accommodation facility 4 or the entertainment facility 5 can make a reservation for use of the facility using a user terminal 6. The user terminal 6 is a terminal that is operable by the user. The user includes a user that owns the POV 7 and a user that does not own the POV 7. The user terminal 6 receives an input from the user. In the present embodiment, a smartphone equipped with a touch panel display is adopted as the user terminal 6. The user terminal 6 includes a built-in computer. However, the user terminal 6 is not limited to a smartphone. For example, a laptop computer, a tablet terminal, a wearable terminal, etc. can also be adopted as the user terminal 6.

The user terminal 6 is registered in advance in the server 1, and configured to be able to bidirectionally communicate with the server 1. Application software (hereinafter also referred to as a "facility use reservation app") for making a reservation for a facility is installed in the user terminal 6. The user can make a reservation for use of a facility and make an action schedule for the day of use using the facility use reservation app. The user terminal 6 can exchange information with the server 1 through the facility use reservation app.

Figure 2:
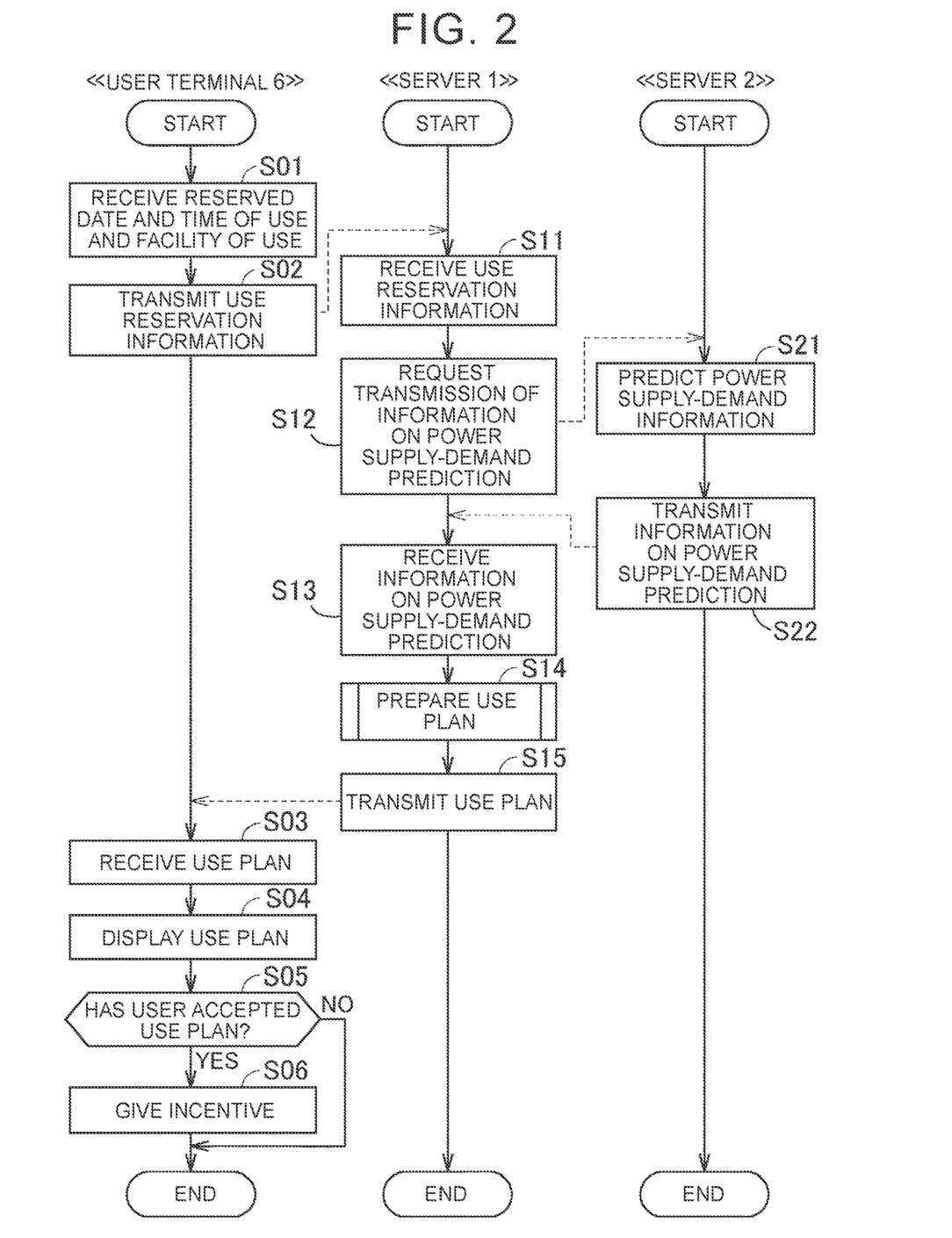
FIG. 2 is a flowchart illustrating a process related to making a reservation for use of a facility using a user terminal.

FIG. 2 is a flowchart illustrating a process related to making a reservation for use of a facility using the user terminal 6. This flowchart is called from a main routine (not illustrated) and repeatedly executed each time a condition determined in advance is met or in cycles determined in advance. In FIG. 2, a series of processes executed by the user terminal 6 is illustrated on the left side, a series of processes executed by the server 1 is illustrated in the middle, and a series of processes executed by the server 2 is illustrated on the right side. While steps are implemented through software processing by the user terminal 6, the server 1, or the server 2, the steps may be implemented by hardware (an electric circuit) provided in the user terminal 6, the server 1, or the server 2. Hereinafter, the steps are abbreviated as "S".

As illustrated in FIG. 2, in S01, the user terminal 6 receives an input about a reservation for use of a facility from a user. In S01, the user can input use reservation information to the user terminal 6 by starting the facility use reservation app. The use reservation information includes information about the facility to be used and the reserved date and time of use. The use reservation information can further include information about whether the POV 7 is to be used, whether the rental car 8 is to be used, and the departure location (e.g. the home of the user), the action schedule for the day of use, and identification information (user ID) on the user.

When a user input about the use reservation information is received, the user terminal 6 transmits the use reservation information to the server 1 in S02.

When the use reservation information is received from the user terminal 6 in S11, the server 1 prepares a facility use plan for the user that operated the user terminal 6 based on the received use reservation information.

Specifically, in S12, the server 1 requests the server 2 to transmit information about a power supply-demand prediction in the power system PG for the reserved date and time of use.

In S21, the server 2 predicts a power supply-demand balance in the power system PG for the reserved date and time of use in response to the transmission request from the server 1. In S21, the server 2 predicts a power supply-demand balance in the power system PG for the reserved date and time of use based on information about power supply-demand performance in the power system PG and information about the reserved date and time of use transmitted from the server 1. The power supply-demand performance information includes information about transitions in the power supply-demand balance in the power system PG and a history of execution of DRs. For example, the server 2 predicts a power supply-demand balance for the reserved date and time of use by referencing power supply-demand performance information obtained under condition, such as season, weather, temperature, and day of the week, that are similar to those of the reserved date and time of use. The weather and the temperature of the reserved date and time of use can be acquired from a meteorological bureau or other weather forecasting services.

In S22, the server 2 transmits the generated information about the power supply-demand prediction in the power system PG to the server 1.

Figure 3:
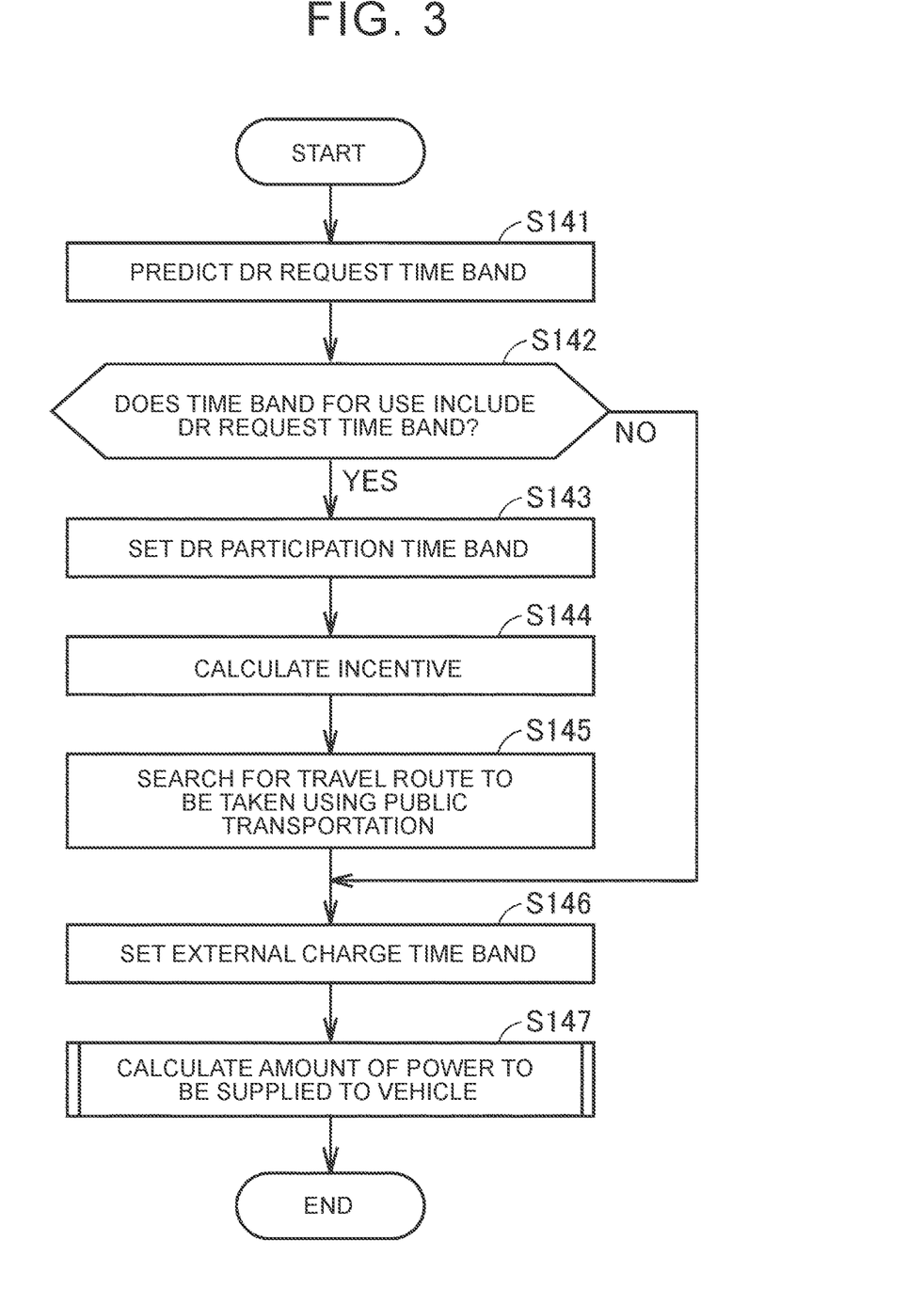
FIG. 3 is a flowchart illustrating an example of a process (S14 in FIG. 2) of preparing a use plan.

In S13, the server 1 receives the information about the power supply-demand prediction in the power system PG from the server 2. In S14, the server 1 prepares a facility use plan using the received power supply-demand prediction information. FIG. 3 is a flowchart illustrating an example of a process (S14 in FIG. 2) of preparing a use plan.

As illustrated in FIG. 3, in S141, the server 1 predicts a time band (hereinafter also referred to as a "DR request time band") for which participation in a DR is requested on the reserved date and time of use based on the information about the power supply-demand prediction in the power system PG. The request for participation in a DR includes the content (e.g. a downward DR or an upward DR) of the requested power adjustment and a DR period (a DR start time and a DR end time). The upward DR is basically a DR that requests an increase in demand. When a power adjustment resource that receives a request is power generation equipment, the upward DR occasionally requests the power adjustment resource for suppression of supply. On the other hand, the downward DR is a DR that requests suppression of demand or a reverse power flow.

In S142, the server 1 makes a comparison between the reserved date and time of use and the DR request time band predicted in S141, and determines whether a time band for which the user uses the facility includes the DR request time band. In S142, a YES determination is made when at least a part of a time band for use of the facility includes the DR request time band. On the other hand, a NO determination is made in S142 when the time band for use of the facility does not include the DR request time band or when there is no DR request time band on the day of use (i.e. when a DR is not performed on the day of use).

When it is determined in S142 that the time band for use of the facility does not include the DR request time band (when a NO determination is made in S142), the server 1 proceeds to S146, and sets a time band (hereinafter also referred to as an "external charge time band") for which the vehicle is externally charged. S146 will be discussed later.

When it is determined in S142 that the time band for use of the facility includes the DR request time band (when a YES determination is made in S142), on the contrary, the server 1 sets a time band (hereinafter also referred to as a "DR participation time band") for which the vehicle that is used by the user can participate in the DR in S143. In S143, a time band that overlaps the DR request time band, of the time band for use of the facility, can be set as the DR participation time band.

Subsequently, in S144, the server 1 calculates an incentive to be given to the user as a compensation for the vehicle participating in the DR. The incentive can include at least one of a bonus about use of the accommodation facility 4 or the entertainment facility 5, a bonus about use of other facilities around the facility, and a bonus about use of public transportation. Examples of the bonus about use of the accommodation facility 4 or the entertainment facility 5 include a discount on the fee for use of the accommodation facility 4 or the entertainment facility 5. Examples of the bonus about use of other facilities include a courtesy ticket (coupon) that can be used in shops around the accommodation facility 4 or the entertainment facility 5. Examples of the bonus about use of public transportation include a discount on fares for trains, buses, etc.

In this manner, it is possible to promote the user to use the accommodation facility 4 and the entertainment facility 5 and nearby facilities because of an incentive, and therefore to contribute to an increase in the profit of the facilities. In addition, it is possible to promote the user to participate in a DR with his/her vehicle because of an incentive, and therefore the server 1 can efficiently perform power adjustment in the power system PG.

The server 1 may adjust the incentive in accordance with the type of the vehicle that participates in a DR. For example, when the vehicle that participates in a DR is the rental car 8, the incentive may be increased compared to when the vehicle is the POV 7. In this manner, it is possible to promote the user to use the rental car 8 because of an incentive, and therefore to increase the number of users of the rental car 8 along with an increase in the number of users of the accommodation facility 4 and the entertainment facility 5. Hence, a contribution can be made to an increase in the profit of the car rental operator 3.

In S145, the server 1 searches for a travel route to be taken when the user travels from the facility in the DR participation time band. In the DR participation time band, the vehicle is connected to the EVSE 14 and cannot be used, and therefore the server 1 searches for a travel route to be taken using public transportation such as a train or a bus. In S145, the server 1 searches for a travel route based on the action schedule of the user included in the use reservation information, map information on the region 110 acquired in advance, the service schedule of the public transportation, etc.

In S146, the server 1 sets an external charge time band. In S146, the server 1 can set an external charge time band in a time band for which the user uses the facility. When the facility use time band includes the DR participation time band, however, the server 1 sets an external charge time band so as not to overlap the DR participation time band. For example, when the user uses the accommodation facility 4, the server 1 can set an external charge time band in a time band (e.g. a midnight time band) for which the user stays at the accommodation facility 4 and the electricity charge is low.

In S147, the server 1 calculates an amount of power to be supplied from the power system PG to the vehicle in the external charge time band. In S147, the server 1 calculates an amount of power needed for travel of the vehicle from an expected travel distance for the next travel. The expected travel distance for the next travel can be calculated from the action schedule of the user. The server 1 calculates an amount of power that enables the vehicle to travel over the expected travel distance.

Figure 4:
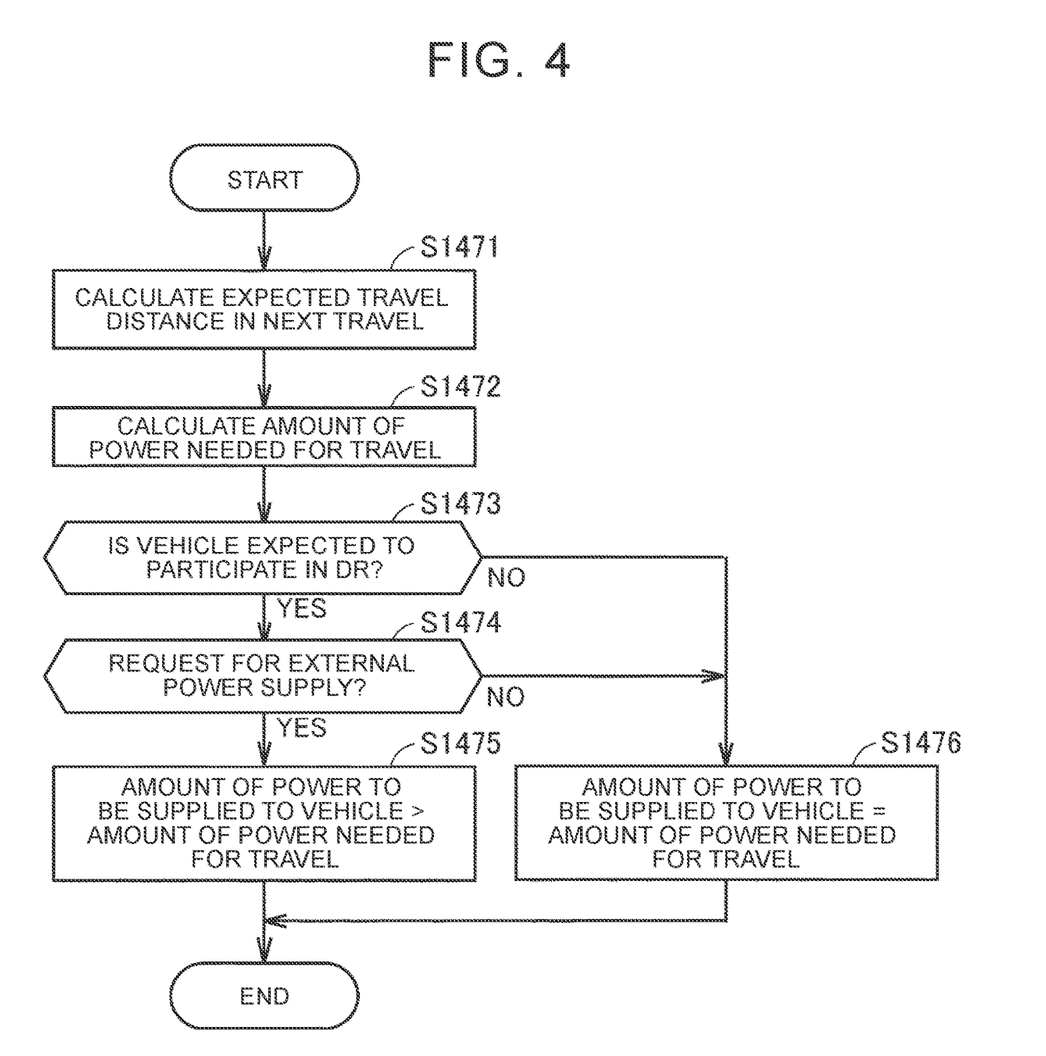
FIG. 4 is a flowchart illustrating an example of a process (S147 in FIG. 3) of calculating an amount of power to be supplied to a vehicle during external power charge.

FIG. 4 is a flowchart illustrating an example of a process (S147 in FIG. 3) of calculating an amount of power to be supplied to the vehicle during external power charge.

As illustrated in FIG. 4, in S1471, the server 1 calculates an expected travel distance in the next travel of the vehicle after external power charge based on the action schedule of the user included in the use reservation information.

In S1472, the server 1 calculates an amount of power needed to travel the calculated expected travel distance. In S1472, an amount of power can be calculated by dividing the expected travel distance (km) by the electrical efficiency (km/kWh) of the vehicle, for example. The electrical efficiency may be an actual performance value based on the travel history of the vehicle (POV or rental car), or may be a value based on big data collected from vehicles of the same type as the vehicle.

In S1473, the server 1 determines whether the vehicle is expected to participate in a DR. A YES determination is made in S1473 when the time band for use of the facility includes the DR participation time band, and a NO determination is made in S1473 when the time band for use of the facility does not include the DR participation time band.

When it is determined that the vehicle is expected to participate in a DR (when a YES determination is made in S1473), the server 1 subsequently determines whether the request for participation in a DR is a request for external power supply in S1474.

When it is determined in S1474 that the request for participation in a DR is a request for external power supply (when a YES determination is made in S1474), the server 1 proceeds to S1475, and sets an amount of power to be supplied to the vehicle during external power charge to be more than the amount of power needed for the next travel calculated in S1472.

When it is determined that the vehicle is not expected to participate in a DR (when a NO determination is made in S1473) or when it is determined that the request for participation in a DR is a request for external power charge (when a NO determination is made in S1474), on the other hand, the server 1 sets an amount of power to be supplied to the vehicle during external power charge, in S1476, to the amount of power needed for the next travel calculated in S1472.

In this manner, the vehicle can accede to a request for a DR by being configured to store an amount of power that is more than the amount of power needed for the next travel during external power charge when the vehicle is expected to participate in a DR in accordance with a request for external power supply. Consequently, the user of the vehicle can acquire the incentive discussed above.

Meanwhile, the vehicle can accede to a request for a DR in a chargeable range by being configured to store the amount of power needed for the next travel during external power charge when the vehicle is expected to participate in a DR in accordance with a request for external power charge. Consequently, the user of the vehicle can acquire the incentive. Even when the vehicle cannot participate in a DR since the user has failed to connect the vehicle to the EVSE 14 in the DR participation time band, the vehicle can securely travel since the amount of power needed for the next travel is stored in the vehicle.

Returning to FIG. 3, the server 1 prepares a plan for use of the facility for the user so as to include the DR participation time band set in S143, the travel route found in S145, the external charge time band set in S146, and the amount of power to be supplied to the vehicle calculated in S147.

Returning to FIG. 2, the server 1 transmits the prepared use plan to the user terminal 6. In S03, the user terminal 6 receives the use plan from the server 1. In S04, the user terminal 6 presents the received use plan to the user by displaying the use plan on the touch panel display of the user terminal 6.

In S05, the user terminal 6 determines whether the user has accepted the use plan. A YES determination is made in S05 when the touch panel display has received a user operation to select the use plan.

When the user has accepted the use plan (when a YES determination is made in S05), the user terminal 6 proceeds to S06, and gives an incentive set in the use plan to the user. In S06, a discount coupon for the fee for use of the accommodation facility 4 or the entertainment facility 5, a courtesy ticket that can be used in other facilities (such as shops) around the accommodation facility 4 or the entertainment facility 5, and a discount coupon for fares for trains, buses, etc. are issued as the incentive, for example. When the user does not accept the use plan (when a NO determination is made in S05), on the other hand, an incentive is not given, and therefore a discount coupon is not issued.

Example of Presentation of Use Plan

Next, a presentation example (display example) of the use plan obtained through the processes discussed above will be described. A use plan for a case where the user makes a reservation for use of the accommodation facility 4 will be described as an example.

First Display Example

Figure 5:
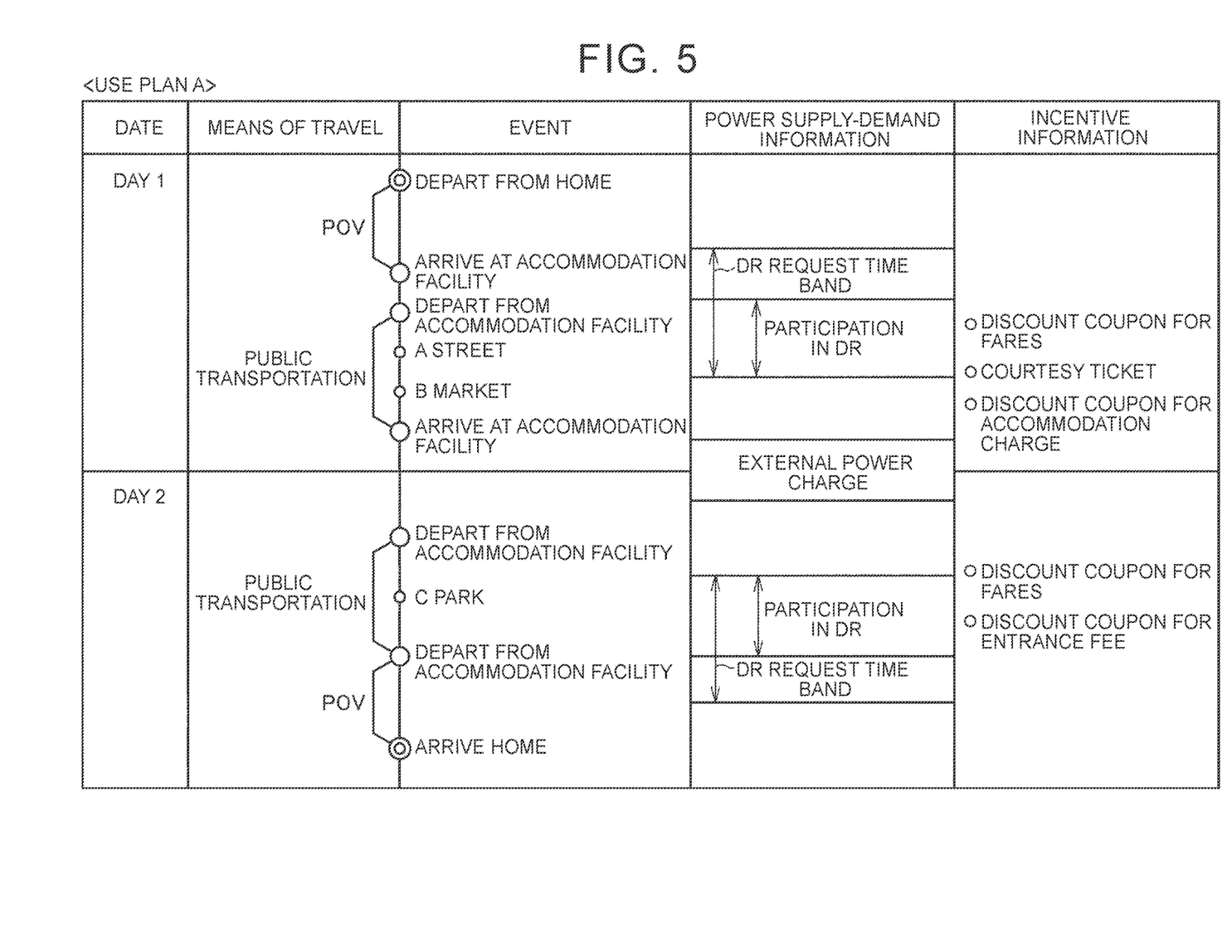
FIG. 5 is a diagram illustrating a first display example of the use plan.

FIG. 5 is a diagram illustrating a first display example of the use plan. The first display example illustrates a use plan A for a case where the POV 7 is used to travel between the departure location (home) and the accommodation facility 4.

The use plan A includes the date and time of use, event, power supply-demand information on the POV 7, and incentive information. In the example in FIG. 5, the date and time of use of the accommodation facility 4 includes two days. The event on the first day includes travel from home to the accommodation facility 4 and a visit to facilities around the accommodation facility 4. Public transportation is used to travel to and from the nearby facilities.

The power supply-demand information for the first day includes information on a DR request time band and a DR participation time band. The DR request time band is a time band for which participation in a DR is requested, and has been predicted based on information about power supply-demand prediction in the power system PG. The DR participation time band is a time band for which the vehicle can participate in a DR, and has been set based on the DR request time band and the time band for use of the accommodation facility 4. In the example in FIG. 5, the DR participation time band is set after the time when the POV 7 arrives at the accommodation facility 4.

A travel route to be taken using public transportation is indicated, since the user cannot use the POV 7, while the POV 7 is participating in a DR. A discount coupon for fares for public transportation, a courtesy ticket that can be used in nearby facilities (shops on the A street and the B market, and a discount coupon for the accommodation charge are included as the incentive to be given for participation in a DR.

The power supply-demand information for the first day further includes information on the external charge time band and the amount of power to be supplied to the vehicle in the external charge time band. In the example in FIG. 5, the external charge time band is set to a time band for which the user stays at the accommodation facility 4 and which is in the midnight when the electricity charge is low. The amount of power to be supplied to the POV 7 during external power charge is set to be equal to or more than an amount of power needed for the POV 7 to travel the expected travel distance on the second day. The expected travel distance of the POV 7 for the second day corresponds to the travel distance from the accommodation facility 4 to home. When the POV 7 participates in a DR by acceding to the request for external power supply on the second day, the amount of power to be supplied to the POV 7 during external power charge is set to be more than an amount of power needed for travel from the accommodation facility 4 to home, in order to enable power supply from the POV 7 to the power system PG.

The event on the second day includes a visit to a facility (C park) around the accommodation facility 4 and travel from the accommodation facility 4 to home. Public transportation is used to travel to and from the nearby facility also on the second day, as on the first day.

The power supply-demand information for the second day includes a DR request time band and a DR participation time band. A discount coupon for fares for public transportation and a discount coupon for the entrance fee of the facility (C park) are given as an incentive for participation in a DR.

When the POV 7 participates in a DR by acceding to a request for external power supply on the second day, the server 1 can control the amount of power to be supplied from the POV 7 to the power system PG in the DR participation time band in such a range that the amount of charge in the POV 7 does not fall below an amount of power needed for travel from the accommodation facility 4 to home. In this manner, it is possible to secure an amount of power needed for travel of the POV 7, and to supply the remaining amount of power to the power system PG. When an incentive is set in accordance with the amount of power to be supplied to the power system PG, there is a possibility that the user can acquire a high incentive.

Second Display Example

Figure 6:
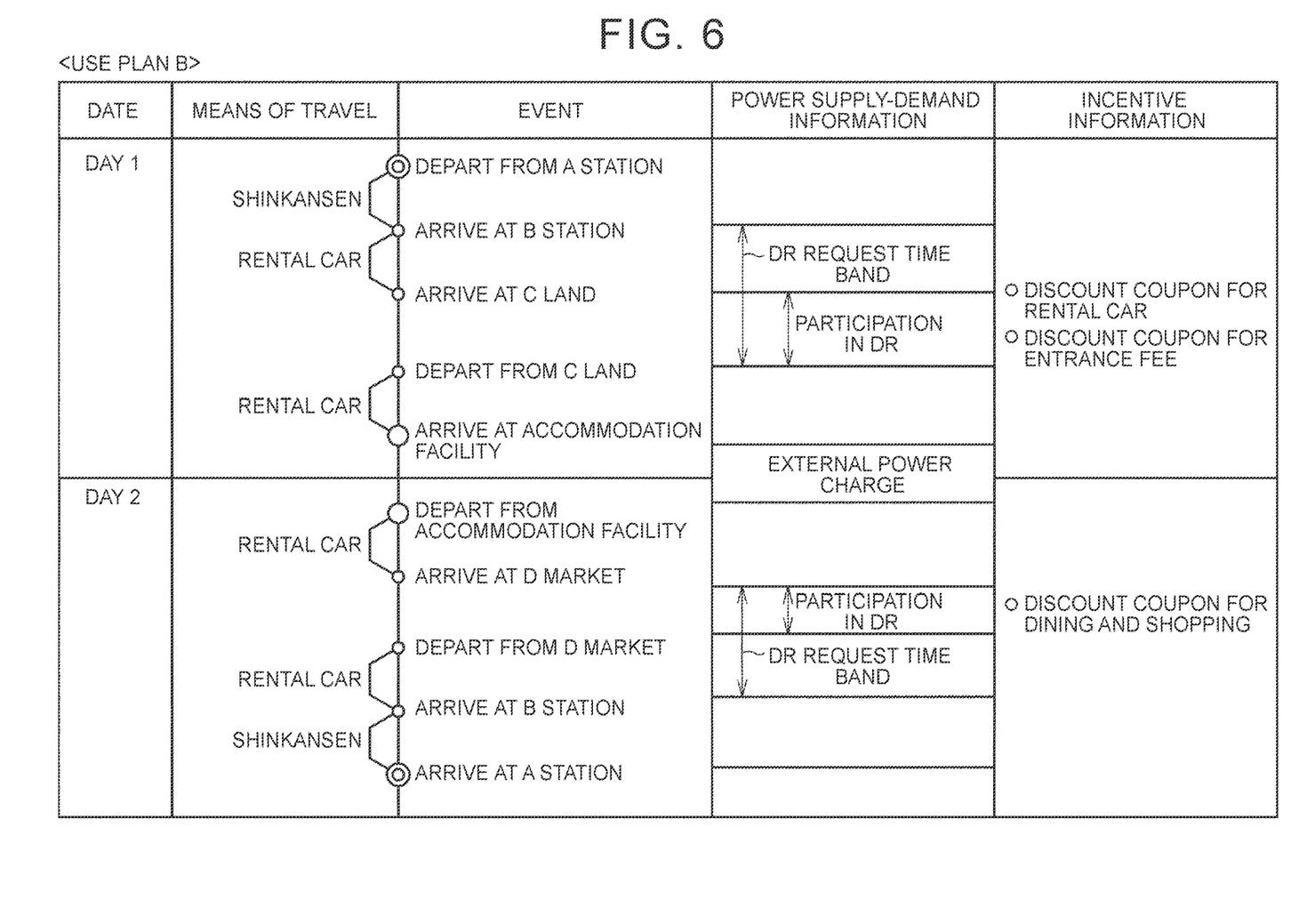
FIG. 6 is a diagram illustrating a second display example of the use plan.

FIG. 6 is a diagram illustrating a second display example of the use plan. The second display example illustrates a use plan B for a case where public transportation (Shinkansen) is used to travel from a departure station (A station) to an arrival station (B station) and the rental car 8 is used to travel from the arrival station (B station) to the entertainment facility 5 (C land) and travel from the entertainment facility 5 to the accommodation facility 4.

The use plan B includes the date and time of use, event, power supply-demand information on the rental car 8, and incentive information. In the example in FIG. 6, the date and time of use of the accommodation facility 4 includes two days. The event on the first day includes travel from a departure station (A station) to the entertainment facility 5 (C land), use of the entertainment facility 5, and travel from the entertainment facility 5 to the accommodation facility 4.

The power supply-demand information for the first day includes information on a DR request time band and a DR participation time band. In the example in FIG. 6, the DR participation time band is set since the time when the rental car 8 arrives at the entertainment facility 5 until the time when the rental car 8 departs from the entertainment facility 5. A discount coupon for the fee for use of the rental car 8 and a discount coupon for the entrance fee of the entertainment facility 5 are included as an incentive to be given for participation in a DR.

The power supply-demand information for the first day further includes information on the external charge time band and the amount of power to be supplied to the vehicle in the external charge time band. In the example in FIG. 6, the external charge time band is set to a time band for which the user stays at the accommodation facility 4 and which is in the midnight when the electricity charge is low. The amount of power to be supplied to the rental car 8 during external power charge is set to be equal to or more than an amount of power needed for the rental car 8 to travel the expected travel distance on the second day. The expected travel distance of the rental car 8 for the second day corresponds to the sum of the travel distance from the accommodation facility 4 to a nearby facility (D market) and the travel distance from the facility to the B station. When the rental car 8 participates in a DR by acceding to a request for external power supply on the second day, the amount of power to be supplied the rental car 8 in the external charge time band is set to be more than an amount of power needed to travel the travel distance for the second day.

The event on the second day includes travel to the facility (D market) around the accommodation facility 4, a visit to the facility, travel from the facility to the B station, and travel from the B station to the A station.

The power supply-demand information for the second day includes a DR request time band and a DR participation time band. A courtesy ticket (e.g. a discount coupon for dining and shopping) that can be used in the facility (D market) is given as an incentive for participation in a DR.

When the rental car 8 participates in a DR by acceding to a request for external power supply on the second day, the server 1 can control the amount of power to be supplied from the rental car 8 to the power system PG in the DR participation time band in such a range that the amount of charge in the rental car 8 does not fall below an amount of power needed for travel from the facility (D market) to the B station. In this manner, it is possible to secure an amount of power needed for travel of the rental car 8, and to supply the remaining amount of power to the power system PG. When an incentive is set in accordance with the amount of power to be supplied to the power system PG, there is a possibility that the user can acquire a high incentive.

With the server 1 and the power adjustment system 100 according to the present embodiment, as has been described above, it is possible to increase the opportunity for the vehicle that is used by the user to participate in a DR, by presenting to the user a use plan that includes participation of the vehicle that is used by the user in a DR when the user makes a reservation for use of the accommodation facility 4 or the entertainment facility 5. In addition, it is possible to promote participation of the vehicle in a DR by giving an incentive to the user that has accepted the use plan. Consequently, it is possible to increase the number of vehicles that participate in a DR, and therefore to efficiently execute power adjustment in the power network.

In addition, by giving an incentive to the user that has accepted participation in a DR, use of the accommodation facility 4 and the entertainment facility 5 by the user is promoted because of an incentive, and therefore it is possible to increase the number of users of the accommodation facility 4 and the entertainment facility 5.

Further, it is also possible to promote use of other facilities around the accommodation facility 4 and the entertainment facility 5 by the user because of an incentive, by giving the user at least one of a bonus about use of the accommodation facility 4 and the entertainment facility 5, a bonus about use of other facilities around the accommodation facility 4 and the entertainment facility 5, and a bonus about use of public transportation.

In addition, use of the rental car 8 can be promoted by increasing an incentive when the vehicle that is used by the user is the rental car 8 compared to when the vehicle is the POV 7.

The embodiment disclosed herein should be considered to be illustrative and not restrictive in all respects. The scope of the present disclosure is indicated by the claims rather than by the above description of the embodiment, and is intended to include all modifications that fall within the meaning and scope equivalent to the claims.

What is claimed is:

1. A server that manages power adjustment resources electrically connected to a power network,
   the power adjustment resources including power equipment installed in a facility and configured to be able to supply power from a vehicle to the power network and charge power from the power network to the vehicle, and
   the server comprising:
   a processor; and
   a memory that stores a program that is executable by the processor, wherein the processor executes the program to:
   receive use reservation information for use of the facility from a user terminal associated with a user;
   transmit, to a second server, a request for a prediction of a power supply-demand balance for a date and time associated with the use reservation information;
   receive, from the second server, a predicted power supply-demand balance for the date and time associated with the user reservation information;
   prepare a facility use plan based on the predicted power supply-demand balance, the facility use plan including a time band for which participation in a demand response is requested on the date and time associated with the use reservation information, the request for participation in the demand response includes a downward demand response or an upward demand response of a requested power adjustment, a demand response time band including a demand response start time and a demand response end time;
   determine whether the date and time associated with the use reservation information includes the demand response time band;
   upon determination that the date and time associated with the use reservation information does not include the demand response time band, set an external charge time band for which the vehicle is externally charged;
   upon determination that the date and time associated with the use reservation includes the demand response time band, set a demand response participation time band for which the vehicle can participate in the demand response;
   give an incentive to the user when the user accepts the use plan; and
   control the power equipment in the facility to perform the requested power adjustment according to the use plan.

2. The server according to claim 1, wherein the processor executes the program to prepare the use plan so as to include information about the time band for which the vehicle participates in the demand response and information about the incentive for such participation.

3. The server according to claim 1, wherein the processor executes the program to increase the incentive when the vehicle is a rental car compared to when the vehicle is a vehicle owned by the user.

4. The server according to claim 1, wherein the incentive includes at least one of a bonus about use of the facility, a bonus about use of other facilities around the facility, and a bonus about use of public transportation.

5. The server according to claim 1, wherein the processor executes the program to:
   calculate an amount of power needed for travel of the vehicle from an expected travel distance of the vehicle acquired from the use plan, and
   set an amount of power to be supplied from the power network to the vehicle so as to be equal to or more than the calculated amount of power.

6. The server according to claim 5, wherein when the vehicle participates in the demand response on the reserved date and time of use and the demand response involves power supply from the vehicle to the power network, the processor executes the program to set the amount of power to be supplied from the power network to the vehicle so as to be more than the amount of power needed for travel of the vehicle.

7. The server according to claim 6, wherein when the demand response involves power supply from the vehicle to the power network, the processor controls the amount of power to be supplied from the vehicle to the power network in such a range that an amount of charge in the vehicle does not fall below the calculated amount of power.

8. A power adjustment system comprising:
   power adjustment resources electrically connected to a power network; and
   a server that manages the power adjustment resources,
   the power adjustment resources including power equipment installed in a facility and configured to be able to supply power from a vehicle to the power network and charge power from the power network to the vehicle, wherein
   when an input of reservation information for using the facility is received from a user, the server
   transmits, to a second server, a request for a prediction of a power supply-demand balance for a date and time associated with the use reservation information,
   receives, from the second server, a predicted power supply-demand balance in the power network on a reserved date and time of use of the facility,
   prepares a facility use plan based on the predicted power supply-demand balance, the facility use plan including a time band for which participation in a demand response is requested on the date and time associated with the use reservation information, the request for participation in the demand response includes a downward demand response or an upward demand response of a requested power adjustment, a demand response time band including a demand response start time and a demand response end time, determines whether the date and time associated with the use reservation information includes the demand response time band, upon determination that the date and time associated with the use reservation information does not include the demand response time band, sets an external charge time band for which the vehicle is externally charged, upon determination that the date and time associated with the use reservation includes the demand response time band, sets a demand response participation time band for which the vehicle can participate in the demand response, gives an incentive to the user when the user accepts the use plan, and controls the power equipment in the facility to perform the requested power adjustment according to the use plan.

* * * * *